United States Patent
Hong et al.

(10) Patent No.: US 12,461,411 B2
(45) Date of Patent: Nov. 4, 2025

(54) OPTICAL DISPLAY DEVICE MODULE AND OPTICAL DISPLAY DEVICE INCLUDING SAME

(71) Applicant: SAMSUNG SDI CO., LTD., Yongin-si (KR)

(72) Inventors: Wan Taek Hong, Suwon-si (KR); Jun Mo Koo, Suwon-si (KR); Bong Choon Kim, Suwon-si (KR); Seung Mi Shin, Suwon-si (KR); Beom Deok Lee, Suwon-si (KR); Seong Hoon Lee, Suwon-si (KR); Seon Gyeong Jeong, Suwon-si (KR); A Ra Jo, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 371 days.

(21) Appl. No.: 18/249,198

(22) PCT Filed: Nov. 1, 2021

(86) PCT No.: PCT/KR2021/015563
§ 371 (c)(1),
(2) Date: Apr. 14, 2023

(87) PCT Pub. No.: WO2022/098016
PCT Pub. Date: May 12, 2022

(65) Prior Publication Data
US 2023/0408860 A1    Dec. 21, 2023

(30) Foreign Application Priority Data
Nov. 3, 2020  (KR) .......................... 10-2020-0145577

(51) Int. Cl.
*G02F 1/1335* (2006.01)

(52) U.S. Cl.
CPC .............................. *G02F 1/133528* (2013.01)

(58) Field of Classification Search
CPC ......... G02F 1/133528; G02F 1/133634; G02F 1/13363; C09D 101/10; C09D 125/06;
(Continued)

(56) References Cited

U.S. PATENT DOCUMENTS

2010/0134448 A1    6/2010  Park et al.
2015/0168624 A1    6/2015  Yaginuma et al.
(Continued)

FOREIGN PATENT DOCUMENTS

JP        2019-082719 A      5/2019
KR    10-2010-0063263 A      6/2010
(Continued)

OTHER PUBLICATIONS

Korean Office Action dated Nov. 13, 2023 issued in corresponding Korean Patent Application No. 10-2020-0145577 (4 pages).
(Continued)

*Primary Examiner* — Mariam Qureshi
(74) *Attorney, Agent, or Firm* — Womble Bond Dickinson (US) LLP (57) ABSTRACT

Provided are an optical display device module and an optical display device including same, the optical display device module comprising an optical display device panel, and a first polarizing plate arranged on at least one surface of the optical display device panel, wherein the first polarizing plate includes a first polarizer and a first phase difference layer arranged between the first polarizer and the optical display device panel, the first phase difference layer includes at least a positive C layer, the optical display device panel includes a second phase difference layer therein, and the second phase difference layer and the first phase difference layer satisfy formula 1 and formula 2.

18 Claims, 2 Drawing Sheets

(a)

(b)

(58) Field of Classification Search
CPC ... G02B 1/04; G02B 1/14; G02B 5/30; G02B 5/3083; G02B 5/3033
See application file for complete search history.

(56) References Cited

U.S. PATENT DOCUMENTS

| | | |
|---|---|---|
| 2016/0146980 A1 | 5/2016 | Shin et al. |
| 2017/0357120 A1 | 12/2017 | Kim et al. |
| 2020/0192165 A1* | 6/2020 | Hasegawa ............ G02B 5/3083 |
| 2021/0302638 A1 | 9/2021 | Yoon et al. |
| 2022/0291436 A1* | 9/2022 | Kim .................... G02B 5/3083 |

FOREIGN PATENT DOCUMENTS

| | | |
|---|---|---|
| KR | 10-1062696 B | 9/2011 |
| KR | 10-2016-0063539 A | 6/2016 |
| KR | 10-2016-0076435 A | 6/2016 |
| KR | 10-2017-0139209 A | 12/2017 |
| KR | 10-2020-0050720 A | 5/2020 |
| KR | 10-2020-0087453 A | 7/2020 |
| KR | 10-2020-0092159 A | 8/2020 |

OTHER PUBLICATIONS

International Search Report of PCT/KR2021/015563, Feb. 15, 2022, 4 pp.

* cited by examiner

OPTICAL DISPLAY DEVICE MODULE AND OPTICAL DISPLAY DEVICE INCLUDING SAME

CROSS-REFERENCE TO RELATED APPLICATIONS

This application is a U.S. National Phase Patent Application of International Application Number PCT/KR2021/015563, filed on Nov. 1, 2021, which claims priority to Korean Patent Application Number 10-2020-0145577, filed on Nov. 3, 2020, the entire content of each of which is incorporated herein by reference.

TECHNICAL FIELD

The present invention relates to an optical display module and an optical display device including the same. More particularly, the present invention relates to an optical display module, which can improve contrast ratio at a lateral side thereof while suppressing light leakage at the lateral side, and an optical display device including the same.

BACKGROUND ART

A liquid crystal display is operated to allow light emitted from a light source to sequentially pass through a light source-side polarizing plate, a liquid crystal panel, and a viewer-side polarizing plate. Since the liquid crystal display allows light emitted from the light source to be vertically emitted through a screen at a front side thereof, the liquid crystal display does not have any problem of contrast ratio at the front side thereof. However, the liquid crystal display has a lower contrast ratio at a lateral side thereof than at the front side thereof. In addition, the liquid crystal display generally suffers from light leakage at the lateral side thereof.

On the other hand, an IPS-mode liquid crystal display displays an image by driving nematic liquid crystals through application of a lateral electric field to the nematic liquid crystals homogeneously aligned with no electric field applied thereto. The IPS-mode liquid crystal display has an advantage of wider viewing angle than other types of liquid crystal displays. However, as the IPS-mode liquid crystal display is required to have a large area and high resolution, there is a need for a method for improving contrast ratio at a lateral side while suppressing light leakage at the lateral side thereof in the IPS-mode liquid crystal display.

The background technique of the present invention is disclosed in Korean Patent Registration No. 10-1062696 and the like.

DISCLOSURE

Technical Problem

It is an aspect of the present invention to provide an optical display module, which can remarkably improve contrast ratio at a lateral side while suppressing light leakage at the lateral side, and an optical display device including the same.

Technical Solution

One aspect of the present invention relates to an optical display module.

1. The optical display module includes: an optical display panel; and a first polarizing plate disposed on at least one surface of the optical display panel, wherein the first polarizing plate includes a first polarizer and a first retardation layer disposed between the first polarizer and the optical display panel, the first retardation layer including at least a positive C layer; the optical display panel includes a second retardation layer therein; and the second retardation layer and the first retardation layer satisfy formulas 1 and 2:

$$|Re1 \times Rth2| \geq 8450 \quad \text{[Formula 1]}$$

$$-2.10 \leq (Re1)/(Rth2) \leq -1.20 \quad \text{[Formula 2]}$$

(In formulas 1 and 2,
Re1 is an in-plane retardation (unit: nm) of the second retardation layer at a wavelength of 550 nm, and
Rth2 is an out-of-plane retardation (unit: nm) of the first retardation layer at a wavelength of 550 nm).

2. In 1, $|Re1 \times Rth2|$ may range from 8,450 to 13,000.
3. In 1 to 2, the second retardation layer may realize a positive A (+A) retardation layer.
4. In 1 to 3, Re1 may range from about 10 nm to about 150 nm.
5. In 1 to 4, Rth2 may range from about −200 nm to less than about 0 nm.
6. In 1 to 5, the first polarizing plate may be disposed outside the optical display panel.
7. In 1 to 6, the positive C layer may have an out-of-plane retardation of about −200 nm to less than about 0 nm at a wavelength of 550 nm.
8. In 1 to 7, the positive C layer may be formed of a composition containing at least one selected from among a cellulose based compound or a polymer thereof and an aromatic based compound or a polymer thereof.
9. In 8, the cellulose based compound may include a cellulose ester based compound and the aromatic based compound may include a polystyrene based compound.
10. 1 to 9, the first retardation layer may be a single layer of the positive C layer.
11. In 1 to 10, the first retardation layer may include the positive C layer and a protective layer stacked on at least one surface of the positive C layer.
12. In 11, the protective layer may be a negative A, negative B, negative C, or positive B retardation layer, with an uniaxial or biaxial property.
13. In 11-12, the protective layer may be free from a positive A layer.
14. In 11-13, the protective layer may have an in-plane retardation about 20 nm or less at a wavelength of 550 nm.
15. In 1 to 14, the optical display panel may further include a liquid crystal layer therein.
16. In 1 to 15, the first polarizing plate may include the first polarizer, the first retardation layer disposed on one surface of the first polarizer, and a first polarizer protective layer disposed on the other surface of the first polarizer.
17. In 1 to 16, the optical display module may include the optical display panel, the first polarizing plate disposed on one surface of the optical display panel, and a second polarizing plate disposed on the other surface of the optical display panel.

Another aspect of the present invention relates to an optical display device.

The optical display device includes the optical display module according to the present invention.

Advantageous Effects

The present invention provides an optical display module, which can remarkably improve contrast ratio at a lateral side thereof while suppressing light leakage thereof at the lateral side, and an optical display device including the same.

DESCRIPTION OF DRAWINGS

FIG. 1 (a) is a sectional view of a first polarizing plate and FIG. 1 (b) is a sectional view of a second polarizing plate.

FIG. 2 (a) is a measurement result of contrast ratio of Example 1, FIG. 2 (b) is a measurement result of contrast ratio of Example 3, and FIG. 3 (c) is a measurement result of contrast ratio of Comparative Example 5.

BEST MODE

Hereinafter, exemplary embodiments of the present invention will be described in detail with reference to the accompanying drawings such that the present invention can be easily implemented by those skilled in the art. It should be understood that the present invention may be embodied in different ways and is not limited to the following embodiments.

In the drawings, components unrelated to description are omitted for clear description of the invention and like components will be denoted by like reference numerals throughout the specification. Although lengths, thicknesses or widths of various components may be exaggerated for understanding in the drawings, the present invention is not limited thereto. Herein, spatially relative terms, such as "upper" and "lower", are defined with reference to the accompanying drawings. Thus, it will be understood that the term "upper surface" can be used interchangeably with the term "lower surface".

Herein, "in-plane retardation Re", "out-of-plane retardation Rth", and "degree of biaxiality NZ" are represented by Equations A, B and C, respectively:

$$Re=(nx-ny) \times d \quad \text{[Equation A]}$$

$$Rth=((nx+ny)/2-nz) \times d \quad \text{[Equation B]}$$

$$NZ=(nx-nz)/(nx-ny) \quad \text{[Equation C]}$$

where nx, ny, and nz are indexes of refraction of a corresponding optical device in a slow axis direction, a fast axis direction and a thickness direction thereof at a measurement wavelength, respectively, and d denotes a thickness of the optical device (unit: nm).

Herein, a lateral side refers to a region (45°, 60°) or (135°, 60°) in the spherical coordinate system represented by (φ, θ) in which a front side is indicated by (0°, 0°), a left end point is indicated by (180°, 90°), and a right end point is indicated by (0°, 90°) with reference to the horizontal direction.

As used herein to represent a specific numerical range, the expression "X to Y" means "greater than or equal to X and less than or equal to Y(X≤ and ≤Y)".

An optical display module according to the present invention enables remarkable reduction in luminance at a lateral side in a black mode, thereby securing remarkable improvement in contrast ratio at the lateral side while suppressing light leakage at the lateral side. When the optical display module provides the same luminance in a white mode, lower luminance in the black mode may indicate further improvement in contrast ratio (ratio of luminance in the white mode to luminance in the black mode) at the lateral side. Specifically, the optical display module according to this invention may have a luminance of less than 0.6 cd/m² at the lateral side ((Φ, θ), particularly, (45°, 60°) or (135°, 60°)) in the black mode.

The optical display module according to the present invention includes an optical display panel and a first polarizing plate disposed on at least one surface of the optical display panel.

The first polarizing plate includes a first polarizer; and a first retardation layer disposed between the first polarizer and the optical display panel. The first retardation layer includes at least a positive C layer. The optical display panel includes a second retardation layer therein. The second retardation layer and the first retardation layer satisfy formulas 1 and 2.

In one embodiment, the first polarizing plate may be disposed outside the optical display panel to be placed on a light exit surface of the optical display panel so as to act as a viewer-side polarizing plate.

Next, an optical display module according to one embodiment of the invention will be described with reference to FIG. 1.

Figure 1:
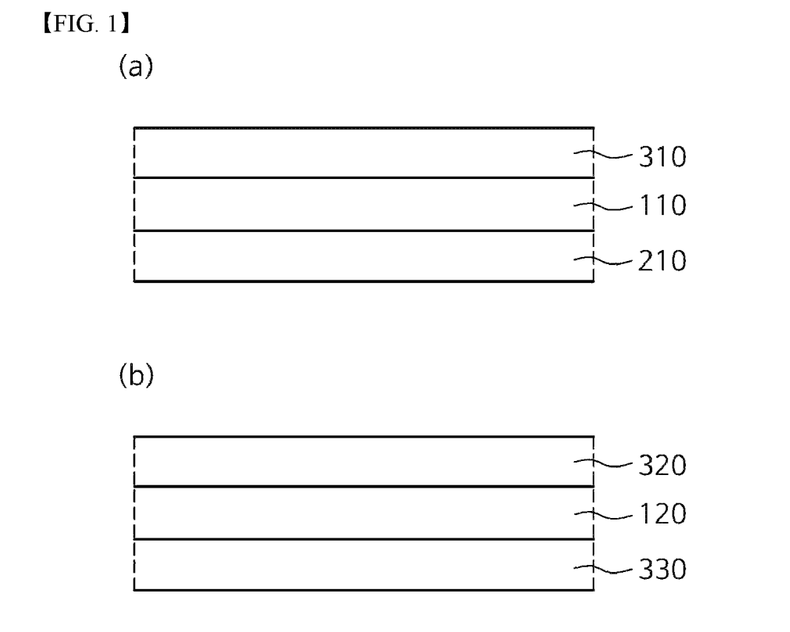

Referring to FIG. 1, the optical display module may include a first polarizing plate (see FIG. 1(a)) and a second polarizing plate (see FIG. 1 (b)). The optical display module may further include an optical display panel stacked between the first polarizing plate and the second polarizing plate. The first polarizing plate may be disposed on one surface of the optical display panel and the second polarizing plate may be disposed on the other surface of the optical display panel.

In one embodiment, the first polarizing plate may be disposed on a light exit surface of the optical display panel and the second polarizing plate may be disposed on a light incidence surface of the optical display panel.

The first polarizing plate includes a first polarizer 110 and a first retardation layer 210 stacked on a lower surface of the first polarizer 110 (on a light incidence surface of the first polarizer). The first retardation layer 210 includes at least a positive C layer. The first retardation layer 210 is disposed between the first polarizer 110 and the optical display panel.

The optical display panel includes a second retardation layer therein.

The second retardation layer and the first retardation layer 210 satisfy the following formulas 1 and 2. With this structure, the optical display module enables remarkable reduction in luminance at a lateral side in a black mode, thereby securing remarkable improvement in contrast ratio at the lateral side while suppressing light leakage at the lateral side.

$$|Re1 \times Rth2| \geq 8450 \quad \text{[Formula 1]}$$

$$-2.10 \leq (Re1)/(Rth2) \leq -1.20 \quad \text{[Formula 2]}$$

In formulas 1 and 2,

Re1 is an in-plane retardation (unit: nm) of the second retardation layer at a wavelength of 550 nm, and Rth2 is an out-of-plane retardation (unit: nm) of the first retardation layer at a wavelength of 550 nm.

In formulas 1, |Re1×Rth2| is unitless and a value without units.

According to this embodiment, the optical display module is formed to satisfy formulas 1 and 2 between phase retardation of the first retardation layer disposed outside the optical display panel to be placed between the optical display panel and the first polarizer and phase retardation of the second retardation layer disposed inside the optical display panel, and the first retardation layer includes at least a positive C layer to achieve the aforementioned effects of the present invention.

Formulas 1 and 2 become references for determination as to whether the optical display module can achieve improvement in contrast ratio at the lateral side while suppressing light leakage at the lateral side, when at least the positive C layer is disposed between the optical display panel and the first polarizer. Typically, the optical display module can achieve improvement in contrast ratio by controlling phase retardation of only the first retardation layer which is disposed between the first polarizer and the optical display panel. On the other hand, the present invention is developed in consideration of a relationship between the first retardation layer and the second retardation layer disposed inside the optical display panel. When any one of formulas 1 and 2 is not satisfied, the optical display module can achieve insignificant improvement in contrast ratio and suppression in light leakage at the lateral side. However, even when the second retardation layer is formed outside the optical display panel to be disposed between the first retardation layer and the optical display panel, the optical display module can achieve insignificant improvement in contrast ratio and suppression in light leakage at the lateral side.

In one embodiment, |Re1×Rth2| of formula 1 may be, for example, about 8,450 or more, for example, 8,450, 8,500, 8,600, 8,700, 8,800, 8,900, 9,000, 9,100, 9,200, 9,300, 9,400, 9,500, 9,600, 9,700, 9,800, 9,900, 10,000, 10,100, 10,200, 10,300, 10,400, 10,500, 10,600, 10,700, 10,800, 10,900, 11,000, 11,100, 11,200, 11,300, 11,400, 11,500, 11,600, 11,700, 11,800, 11,900, 12,000, 12,100, 12,200, 12,300, 12,400, 12,500, 12,600, 12,700, 12,800, 12,900, or 13,000, specifically 8,450 to 13,000, more specifically 8,400 to 12,000, 8,450 to 10,100, 8,500 to 10,100, or 8,500 to 9,000. Within this range, the optical display module can achieve the above effects, and allows easy manufacture of the first retardation layer, the second retardation layer and the optical display panel.

In one embodiment, (Re1)/(Rth2) of formula 2 (ratio of Re1 to Rth2) may be, for example, −2.10, −2.00, −1.90, −1.80, −1.70, −1.60, −1.50, −1.40, −1.30, or −1.20, specifically −2.075 to −1.3, more specifically −1.6 to −1.3. Within this range, the optical display module can achieve the above effects while allowing easy manufacture of the first retardation layer, the second retardation layer and the optical display panel.

The first retardation layer and the second retardation layer can satisfy formulas 1 and 2 by adjusting retardation values of the first retardation layer and the second retardation layer.

Optical Display Panel

The optical display panel has different alignments of liquid crystals depending upon application of voltage and may allow emission of light emitted from a light source.

The optical display panel may include an image display medium.

In one embodiment, the optical display panel may include a liquid crystal layer disposed as the image display medium therein. However, it should be understood that the present invention is not limited thereto. The liquid crystal layer may include horizontal alignment-mode liquid crystals, for example, in-plane switching (IPS) mode or fringe field switching (FFS) mode liquid crystals. As a result, an optical display device can achieve improvement in color reproduction and viewing angle.

The optical display panel includes the second retardation layer therein.

The second retardation layer may have an in-plane retardation Re1 of about 10 nm to about 150 nm, for example, about 10 nm, 20 nm, 30 nm, 40 nm, 50 nm, 60 nm, 70 nm, 80 nm, 90 nm, 100 nm, 110 nm, 120 nm, 130 nm, 140 nm, or 150 nm, specifically about 30 nm to about 145 nm, more specifically about 50 nm to about 130 nm, at a wavelength of 550 nm. Within this range, the optical display panel can easily satisfy formulas 1 and 2, reduction in thickness of the optical display panel can be ensured, and the optical display panel can be easily manufactured.

The second retardation layer may realize a positive A (+A) retardation layer (nx>ny≈nz, nx, ny and nz being the indexes of refraction of the second retardation layer at a wavelength of 550 nm in the slow axis direction, the fast axis direction, and the thickness direction, respectively).

In the present invention, the second retardation layer of the optical display panel realizes positive A retardation and the first retardation layer thereof includes at least a positive C layer. With this structure, the optical display module can easily realize the effects of the present invention and does not require positive A retardation for the viewer-side polarizing plate, thereby securing reduction in thickness of an optical display device and easy fabrication of the first polarizing plate through a roll-to-roll process. In one embodiment, the polarizing plate may not include a positive A retardation layer.

Although the second retardation layer may be formed of a non-liquid crystalline composition, the second retardation layer is preferably formed by depositing a liquid crystalline composition on a lower surface of a first substrate of the optical display panel described below, followed by curing the liquid crystalline composition in consideration of a liquid crystal layer that can be formed inside the optical display panel. For example, the second retardation layer may be formed by forming an alignment layer on the lower surface of the first substrate and depositing the liquid crystalline composition on the alignment layer, followed by curing the liquid crystalline composition. The liquid crystalline composition may contain a typical liquid crystalline material capable of implementing the aforementioned in-plane retardation Re1 and positive A retardation, which is known to those skilled in the art. Phase retardation of the second retardation layer may be adjusted by controlling the kind of liquid crystalline composition to be used, coating thickness, curing conditions, and the like.

The optical display panel may include at least one substrate to facilitate the inclusion of the image display medium and the second retardation layer inside the optical display panel. However, it should be understood that the present invention is not limited thereto.

In one embodiment, the optical display panel may include a pair of substrates facing each other, that is, a first substrate and a second substrate. A space inside the optical display panel, for example, a space partitioned by the first substrate and the second substrate, may include the image display medium and the second retardation layer.

The first substrate is a color filter substrate and may be provided with a color filter and a black matrix. The second substrate is an active matrix substrate and may be provided with a switching element (for example, TFT) for controlling electrical and optical properties of the image display medium, and signal lines and pixel lines for supplying gate signals to the switching element. However, it should be understood that the first substrate and the second substrate are not limited thereto.

The optical display panel may have a thickness of greater than about 0 mm to about 10 mm, specifically about 5 mm to about 10 mm. Within this range, the optical display panel is applicable to an optical display device.

First Polarizing Plate and Second Polarizing Plate

Referring to FIG. 1, the first polarizing plate may include a first polarizer 110, a first polarizer protective layer 310 stacked on an upper surface (light exit surface) of the first polarizer 110, and a first retardation layer 210 stacked on a lower surface (light incidence surface) of the first polarizer 110. The second polarizing plate may include a second polarizer 120, a second polarizer protective layer for the second polarizer 320 stacked on an upper surface (light exit surface) of the second polarizer 120, and a third polarizer protective layer 330 stacked on a lower surface (light incidence surface) of the second polarizer 120.

In one embodiment, each of the first polarizing plate and the second polarizing plate may be disposed outside the optical display panel. The first polarizing plate may be used as a viewer-side polarizing plate and the second polarizing plate may be used as a light source-side polarizing plate.

Each of the first polarizing plate and the second polarizing plate may be stacked on the optical display panel via a bonding layer. The bonding layer may be formed of a typical bonding agent known to those skilled in the art, for example, a water-based bonding agent or a photocurable bonding agent, without being limited thereto.

First Retardation Layer

The first retardation layer 210 is disposed on one surface of the optical display panel and emits light received from the optical display panel towards the first polarizer 110. The first retardation layer 210 is formed outside the optical display panel.

The first retardation layer 210 includes at least a positive C (+C) layer.

The positive C layer means a layer that exhibits positive uniaxial properties having substantially the same nx and ny values and has an optical axis in a normal direction. The positive C layer is a retardation layer having a relation of nz>nx≈ny (nx, ny, and nz being the indexes of refraction of the positive C layer in the slow axis direction, the fast axis direction and the thickness direction thereof at a wavelength of 550 nm, respectively).

The positive C layer may have an out-of-plane retardation Rth3 of −200 nm to less than 0 nm, for example, about −200 nm, −190 nm, −180 nm, −170 nm, −160 nm, −150 nm, −140 nm, −130 nm, −120 nm, −110 nm, −100 nm, −90 nm, −80 nm, −70 nm, −60 nm, −50 nm, −40 nm, −30 nm, −20 nm, −10 nm, −5 nm, or −0.1 nm, specifically about −180 nm to about −5 nm, more specifically about −150 nm to about −30 nm, at a wavelength of 550 nm. Within this range, the first and second retardation layers can satisfy formulas 1 and 2 and the positive C layer can be easily formed.

The positive C layer may have an in-plane retardation Re3 of about 20 nm or less, for example, about 0 nm, 1 nm, 2 nm, 3 nm, 4 nm, 5 nm, 6 nm, 7 nm, 8 nm, 9 nm, 10 nm, 11 nm, 12 nm, 13 nm, 14 nm, 15 nm, 16 nm, 17 nm, 18 nm, 19 nm, or 20 nm, specifically about 0 nm to about 20 nm, more specifically about 0 nm to about 10 nm, at a wavelength of 550 nm. Within this range, the positive C layer can easily reach a target out-of-plane retardation Rth2.

The positive C layer may have a thickness of about 0.001 µm to about 100 m, specifically about 0.001 µm to about 50 µm. Within this range, the positive C layer can be used in a polarizing plate.

The positive C layer may be formed of any material and may have any shape so long as the positive C layer can exhibit optical characteristics.

In one embodiment, the positive C layer may be a polymer film formed of a polymer or resin film having birefringence. In this case, phase retardation of the positive C layer can be realized by controlling the index of refraction, elongation, and thickness of the polymer or resin film.

The polymer film having birefringence may be produced by stretching a non-stretched film for the positive C layer in a thickness direction of the non-stretched film while heating the non-stretched film bonded to a support film, without being limited thereto. Alternatively, the polymer film having birefringence may include a film prepared by stretching a non-stretched film containing a retardation retarder so as to realize phase retardation in the thickness direction.

In another embodiment, the positive C layer may be a liquid crystal layer formed by depositing or transferring a low molecular weight or high molecular weight liquid crystalline compound onto a transparent support. In this case, phase retardation of the positive C layer may be realized by controlling the thickness of the liquid crystal layer, the indexes of refraction of components constituting the liquid crystal layer, and the like.

The liquid crystal layer formed of the liquid crystalline compound may include a layer formed by vertically aligning a cholesteric discotic liquid crystal compound or a composition including the same, followed by fixing the liquid crystals, or a layer formed by vertically aligning a rod-shaped liquid crystal compounds having a positive refractive index birefringence or a composition including the same, followed by fixing the liquid crystals. The rod-shaped liquid crystal compound may employ nematic liquid crystals, smectic liquid crystals, lyotropic liquid crystals, and the like depending on the temperature range for alignment fixation. The composition may further include a polymerization initiator, a vertical alignment agent, and conventional additives. The composition may further include a polymerization initiator, a vertical alignment agent, and typical additives. The liquid crystal layer formed of the liquid crystal compound may have a thickness of about 0.001 µm to about 10 µm, specifically about 0.05 µm to about 1.5 µm.

In another embodiment, the positive C layer may be a coating layer formed by coating the low molecular weight or high molecular weight non-liquid crystalline compound or a composition including the same onto the transparent support, followed by curing. In this case, phase retardation of the positive C layer may be realized by controlling the thickness of the coating layer, the indexes of refraction of components constituting the coating layer, a solvent included in the composition for the coating layer, curing conditions including a curing temperature, and the like.

The low molecular weight or high molecular weight non-liquid crystalline compound for the coating layer formed of the non-liquid crystalline compound is a non-crystalline compound and is not limited to a particular compound so long as the coating layer can realize the above out-of-plane retardation.

In one embodiment, the low molecular weight or high molecular weight non-liquid crystalline polymer may be formed of a composition containing a cellulose based compound or a polymer thereof and/or an aromatic based compound or a polymer thereof. In particular, the positive C layer may contain the cellulose ester based compound or a polymer thereof and/or the aromatic based compound or a polymer thereof. The cellulose ester based compound or a polymer thereof and the aromatic based compound or a polymer thereof may be suitable for formation of the positive C layer according to the present invention.

The cellulose ester based compound may include at least one selected from among a cellulose ester based resin, a cellulose ester based oligomer, and a cellulose ester based monomer.

The cellulose ester based compound may include a condensation product obtained through reaction between hydroxyl group(s) on a cellulose based compound and carboxylic acid(s) or carboxylic anhydride.

The cellulose ester based compound may be regioselectively or randomly substituted. Regioselectivity may be measured by determining a relative degree of substitution at the positions of $C_6$, $C_3$ and $C_2$ on the cellulose ester by carbon 13 NMR. The cellulose ester based compound may be prepared by a typical method through contact between a cellulose solution and at least one $C_1$ to $C_{20}$ acylation agent for a sufficient contact time to provide a cellulose ester having a desired degree of substitution and a desired degree of polymerization.

Preferably, the acylation agent includes at least one linear or branched $C_1$ to $C_{20}$, alkyl or aryl carboxylic anhydride, carboxylic acid halide, diketone, or acetoacetic ester. Examples of the carboxylic anhydride may include acetic anhydride, propionic anhydride, butyric anhydride, isobutyric anhydride, valeric anhydride, hexanoic anhydride, 2-ethylhexanoic anhydride, nonanoic anhydride, lauric anhydride, palmitic anhydride, stearic anhydride, benzoic anhydride, substituted benzoic anhydride, phthalic anhydride, and isophthalic anhydride. Examples of the carboxylic acid halide may include acetyl chloride, propionyl chloride, butyryl chloride, hexanoyl chloride, 2-ethylhexanoyl chloride, lauroyl chloride, palmitoyl chloride, benzoyl chloride, substituted benzoyl chloride, and stearoyl chlorides. Examples of the acetoacetic ester may include methyl acetoacetate, ethyl acetoacetate, propyl acetoacetate, butyl acetoacetate, and tertiary butyl acetoacetate. Most preferably, the acylation agent includes linear or branched $C_2$ to $C_9$, alkyl carboxylic acid anhydrides, such as acetic anhydride, propionic anhydride, butyric anhydride, 2-ethylhexanoic anhydride, nonanoic anhydride, and stearic anhydride.

Preferably, the cellulose ester based compound includes, for example, cellulose acetate (CA), cellulose acetate propionate (CAP), and cellulose acetate butyrate (CAB), without being limited thereto.

In one embodiment, the cellulose ester based compound may include at least two acyl group substituents. At least one of the acyl groups may include an aromatic substituent and, in the cellulose ester based compound, a relative degree of substitution (RDS) may be set in the order of C6>C2>C3>C6 means a degree of substitution at the position of the number 6 carbon in the cellulose ester based compound, C2 means a degree of substitution at the number 2 carbon in the cellulose ester based compound, and C3 means a degree of substitution at the number 3 carbon in the cellulose ester based compound. The aromatic compound may include benzoate or substituted benzoate.

In another embodiment, the cellulose ester based compound may include a regioselectively substituted cellulose ester based compound having:
(a) a plurality of chromophore-acyl substituents; and
(b) a plurality of pivaloyl substituents.

The cellulose ester based compound may have a degree of hydroxyl group substitution of about 0.1 to about 1.2 and a degree of chromophore-acyl substitution of about 0.4 to about 1.6; a difference between a total sum of the degree of chromophore-acyl substitution at the number 2 carbon in the cellulose ester based compound, the degree of chromophore-acyl substitution at the number 3 carbon in the cellulose ester based compound and the degree of chromophore-acyl substitution at the number 6 carbon in the cellulose ester based compound may range from about 0.1 to about 1.6; and the chromophore-acyl may be selected from among (i), (ii), (iii), and (iv):

(i) ($C_6$ to $C_{20}$)aryl-acyl, where aryl is unsubstituted or substituted with 1 to 5 $R^1$s, (ii) hetero-aryl, where hetero-aryl is a five to ten-membered ring having 1 to 4 hetero atoms selected from among N, O and S, and is unsubstituted or substituted with 1 to 5 $R^1$s;

(iii)

where aryl is a $C_1$ to $C_6$ aryl,
the aryl being unsubstituted or substituted with 1 to 5 $R^1$s, (iv)

where heteroaryl is a five to ten-membered ring having 1 to 4 hetero atoms selected from among N, O and S, and is unsubstituted or substituted with 1 to 5 $R^1$s, $R^1$s being each independently nitro, cyano, ($C_1$ to $C_6$)alkyl, halo($C_1$ to $C_6$)alkyl, ($C_6$ to $C_{20}$)aryl-$CO_2$—, ($C_6$ to $C_{20}$)aryl, ($C_1$ to $C_6$)alkoxy, halo($C_1$ to $C_6$)alkoxy, halo, five to ten-membered heteroaryl having 1 to 4 hetero atoms selected from among N, O and S, or

In one embodiment, the chromophore-acyl may be unsubstituted or substituted benzoyl or unsubstituted or substituted naphthyl.

In one embodiment, the chromophore-acyl may be selected from the group consisting of -continued where * indicates a linking site of the chromophore-acyl substituent to oxygen of the cellulose ester based compound.

In another embodiment, the cellulose ester based compound may include an ester polymer having an acyl unit, in which at least some hydroxyl groups [a $C_2$ hydroxyl group, a $C_3$ hydroxyl group, or a $C_6$ hydroxyl group] of a sugar monomer constituting cellulose are unsubstituted or substituted, as represented by Chemical Formula 1.

[Chemical Formula 1]

where n is an integer of 1 or more.

A substituent group for the cellulose ester polymer or the acyl unit may include at least one selected from among a halogen, a nitro group, an alkyl group (for example, a $C_1$ to $C_{20}$ alkyl group), an alkenyl group (for example, a $C_2$ to $C_{20}$ alkenyl group), a cycloalkyl group (for example, a $C_3$ to $C_{10}$ cycloalkyl group), an aryl group (for example, a $C_6$ to $C_{20}$ aryl group), a heteroaryl group (for example, a $C_3$ to $C_{10}$ aryl group), an alkoxy group (for example, a $C_1$ to $C_{20}$ alkoxy group), an acyl group, and a halogen-containing functional group. The substituent groups may be the same as or different from each other.

Herein, "acyl" may mean R—C(=O)—*(* being a linking site, R being a $C_1$ to $C_{20}$ alkyl group, a $C_3$ to $C_{20}$ cycloalkyl group, a $C_6$ to $C_{20}$ aryl group, or a $C_7$ to $C_{20}$ arylalkyl group), as well-known in the art. The "acyl" is coupled to a ring of the cellulose through ester bonding (through an oxygen atom) in the cellulose.

Here, "alkyl", "alkenyl", "cycloalkyl", "aryl", "heteroaryl", "alkoxy", and "acyl" refer to non-halogen based compounds for convenience. The composition for the second retardation layer may include the cellulose ester polymer alone or a mixture including the cellulose ester polymer.

Here, "halogen" means fluorine (F), Cl, Br, or I, preferably F.

The "halogen-containing functional group" is an organic functional group containing at least one halogen and may include an aromatic, aliphatic or alicyclic functional group. For example, the halogen-containing functional group may mean a halogen-substituted $C_1$ to $C_{20}$ alkyl group, a halogen-substituted $C_2$ to $C_{20}$ alkenyl group, a halogen-substituted $C_2$ to $C_{20}$ alkynyl group, a halogen-substituted $C_3$ to $C_{10}$ cycloalkyl group, a halogen-substituted $C_1$ to $C_{20}$ alkoxy group, a halogen-substituted acyl group, a halogen-substituted $C_6$ to $C_{20}$ aryl group, or a halogen-substituted $C_7$ to $C_{20}$ arylalkyl group, without being limited thereto.

The "halogen-substituted acyl group" may be R'—C(=O)—*(* being a linking site, R' being a halogen-substituted $C_1$ to $C_{20}$ alkyl group, a halogen-substituted $C_3$ to $C_{20}$ cycloalkyl, a halogen-substituted $C_6$ to $C_{20}$ aryl, or a halogen-substituted $C_7$ to $C_{20}$ arylalkyl). The "halogen-substituted acyl group" may be coupled to a ring of the cellulose through ester bonding (through an oxygen atom) in the cellulose.

Preferably, the composition includes a cellulose ester based polymer substituted with an acyl group, a halogen, or a halogen-containing functional group. More preferably, the halogen is fluorine.

For formation of the positive C layer, the cellulose ester based polymer may be prepared by a typical method known to those skilled in the art or may be obtained from commercially available products. For example, the cellulose ester based polymer having an acyl group as a substituent group may be prepared by reacting trifluoroacetic acid or trifluoroacetic anhydride with the sugar monomer constituting the cellulose represented by Formula 1 or a polymer of the sugar monomer, by reacting trifluoroacetic acid or trifluoroacetic anhydride therewith, followed by additionally reacting an acylation agent (for example, an anhydride of carboxylic acid, or carboxylic acid) therewith, or by reacting both trifluoroacetic acid or trifluoroacetic anhydride and the acylation agent therewith.

The aromatic based compound includes a phenyl group and may include a polystyrene based compound or a fluorobenzene or difluorobenzene structure, without being limited thereto. In one embodiment, the polystyrene based compound may include a moiety represented by Chemical Formula 2:

[Chemical Formula 2]

where ∿∿∿∿∿ is a linking site of an atom;

$R^1$, $R^2$ and $R^3$ are each independently a hydrogen atom, a non-substituted alkyl group, a substituted alkyl group, or a halogen;

Rs are each independently a substituent group on a styrene ring; and n is an integer of 0 to 5 indicating the number of substituent groups on the styrene ring.

Examples of the substituent group R on the styrene ring may include an alkyl group, a substituted alkyl group, a halogen, a hydroxyl group, a carboxyl group, a nitro group, an alkoxy group, an amino group, a sulfonate group, a phosphate group, an acyl group, an acyloxy group, a phenyl group, an alkoxycarbonyl group, and a cyano group. The substituted alkyl group means an alkyl group substituted with the above substituted group.

The moiety of Formula 2 may contain a halogen.

In one embodiment, at least one of $R^1$, $R^2$ and $R^3$ may be hydrogen or a halogen, preferably hydrogen or fluorine.

The coating layer formed of the non-liquid crystalline compound may have a thickness of about 0.1 μm to about 50 μm, specifically about 0.5 μm to about 30 m, more specifically about 3 μm to about 25 μm.

In one embodiment, the first retardation layer may be a single retardation layer. The single retardation layer is a positive C layer and only the positive C layer may be disposed as a retardation layer between the first polarizer and the optical display panel. For lamination of the positive C layer on the optical display panel, an adhesive layer, a bonding layer or an adhesive/bonding layer may be further added so long as these layers provide no phase retardation or insignificant phase retardation not affecting realization of the effects of the present invention.

In this case, the positive C layer may be formed by transferring the liquid crystal layer or the coating layer formed on a release film or a transparent support to the first polarizer or by coating the aforementioned composition onto the first polarizer, followed by curing the composition.

The first retardation layer, that is, the positive C layer, may have an out-of-plane retardation Rth2 of about −200 nm to less than about 0 nm, for example, about −200 nm, −190 nm, −180 nm, −170 nm, −160 nm, −150 nm, −140 nm, −130 nm, −120 nm, −110 nm, −100 nm, −90 nm, −80 nm, −70 nm, −60 nm, −50 nm, −40 nm, −30 nm, −20 nm, −10 nm, −5 nm, or −0.1 nm, specifically about −180 nm to about −5 nm, more specifically about −150 nm to about −30 nm, at a wavelength of 550 nm. Within this range, the first retardation layer can easily satisfy formulas 1 and 2 and the positive C layer can be easily manufactured. The first retardation layer, that is, the positive C layer, may have an in-plane retardation Re2 of about 20 nm or less, for example, about 0 nm, 1 nm, 2 nm, 3 nm, 4 nm, 5 nm, 6 nm, 7 nm, 8 nm, 9 nm, 10 nm, 11 nm, 12 nm, 13 nm, 14 nm, 15 nm, 16 nm, 17 nm, 18 nm, 19 nm, or 20 nm, specifically about 0 nm to about 20 nm, more specifically about 0 nm to about 10 nm, at a wavelength of 550 nm. Within this range, the first retardation layer can easily reach the out-of-plane retardation Rth2.

In another embodiment, the retardation layer may be a retardation layer laminate including at least two layers. The retardation layer laminate including at least a positive C layer may be disposed between the first polarizer and the optical display panel. In this case, the retardation layer laminate and the optical display panel satisfy both formula 1 and formula 2, thereby improving contrast ratio at the lateral side while suppressing light leakage at the lateral side.

For example, the retardation layer laminate may include a positive C layer and a protective layer stacked on at least one surface of the positive C layer.

The retardation layer laminate may have an out-of-plane retardation Rth2 of about −200 nm to less than about 0 nm, for example, about −200 nm, −190 nm, −180 nm, −170 nm, −160 nm, −150 nm, −140 nm, −130 nm, −120 nm, −110 nm, −100 nm, −90 nm, −80 nm, −70 nm, −60 nm, −50 nm, −40 nm, −30 nm, −20 nm, −10 nm, −5 nm, −0.1 nm, specifically about −180 nm to about −5 nm, more specifically about −150 nm to about −30 nm, at a wavelength of 550 nm. Within this range, the retardation layer laminate can easily reach formulas 1 and 2 and allows easy formation of the positive C layer.

The retardation layer laminate may have an in-plane retardation Re2 of about 20 nm or less, for example, about 0 nm, 1 nm, 2 nm, 3 nm, 4 nm, 5 nm, 6 nm, 7 nm, 8 nm, 9 nm, 10 nm, 11 nm, 12 nm, 13 nm, 14 nm, 15 nm, 16 nm, 17 nm, 18 nm, 19 nm, or 20 nm, specifically about 0 nm to about 20 nm, more specifically about 0 nm to about 10 nm, at a wavelength of 550 nm. Within this range, the retardation layer laminate can easily reach the out-of-plane retardation Rth2.

In one embodiment, the retardation layer laminate may include a positive C layer and a protective layer stacked on an upper surface of the positive C layer. In another embodiment, the retardation layer laminate may include a positive C layer and a protective layer stacked on a lower surface of the positive C layer. In another embodiment, the retardation layer laminate may include a positive C layer, a first protective layer stacked on an upper surface of the positive C layer, and a second protective layer stacked on a lower surface of the positive C layer.

The protective layer has uniaxial or biaxial properties and may have negative A ($nx=nz>ny$), negative B ($nx>ny>nz$), negative C ($nx=ny>nz$), or positive B ($nz>nx>ny$) retardation characteristics. Here, nx, ny, and nz are the indexes of refraction of the protective layer in the slow axis direction, the fast axis direction and the thickness direction thereof at a wavelength of 550 nm, respectively.

In one embodiment, the protective layer may not include a positive A layer.

The protective layer may be composed of a single layer or at least two layers.

The protective layer may be a polymer film composed of a polymer, a liquid crystal layer formed by depositing or transferring a low molecular weight or high molecular weight liquid crystalline compound onto a transparent support, or a coating layer formed by depositing or transferring a low molecular weight or high molecular weight non-liquid crystalline compound or a composition including the same onto a transparent support, followed by curing. The film type protective layer may be a film formed of at least one resin selected from among cellulose based resins including triacetylcellulose (TAC) and the like, polyester based resins including polyethylene terephthalate (PET), polybutylene terephthalate, polyethylene naphthalate, polybutylene naphthalate, and the like, cyclic polyolefin (COP) based resins, polycarbonate based resins, polyether sulfone based resins, polysulfone based resins, polyamide based resins, polyimide based resins, polyolefin based resins, polyarylate based resins, polyvinyl alcohol based resins, polyvinyl chloride based resins, polyvinylidene chloride based resins, and acryl based resins, without being limited thereto. The liquid crystal layer may be formed of not only the aforementioned nematic liquid crystals, smectic liquid crystals, and lyotropic liquid crystals, but also typical liquid crystals known to those skilled in the art. The coating layer may be formed by employing not only the aforementioned cellulose ester based or polystyrene based resins but also a typical low molecular weight or high molecular weight material known to those skilled in the art.

The protective layer may have predetermined ranges of in-plane retardation, out-of-plane retardation and/or biaxiality not affecting formulas 1 and 2 of the retardation layer.

In one embodiment, the protective layer may have an in-plane retardation of about 20 nm or less, for example, about 0 nm, 1 nm, 2 nm, 3 nm, 4 nm, 5 nm, 6 nm, 7 nm, 8 nm, 9 nm, 10 nm, 11 nm, 12 nm, 13 nm, 14 nm, 15 nm, 16 nm, 17 nm, 18 nm, 19 nm, or 20 nm, specifically about 0 nm to about 10 nm, at a wavelength of 550 nm. Within this range, the protective layer does not affect realization of the effects of the positive C layer.

In one embodiment, the protective layer may have an out-of-plane retardation of about 10 nm or less, for example, about −10 nm, −9 nm, −8 nm, −7 nm, −6 nm, −5 nm, −4 nm, −3 nm, −2 nm, −1 nm, 0 nm, 1 nm, 2 nm, 3 nm, 4 nm, 5 nm, 6 nm, 7 nm, 8 nm, 9 nm, or 10 nm, specifically about −10 nm to about 10 nm, at a wavelength of 550 nm. Within this range, the protective layer does not affect realization of the effects of the positive C layer.

The protective layer may have a thickness of about 20 μm to about 100 μm, specifically about 25 μm to about 40 μm. Within this range, the protective layer can be applied to the retardation layer.

First Polarizer and Second Polarizer

Each of the first polarizer 110 and the second polarizer 120 serves to convert natural light or polarized light into linearly polarized light through linear polarization in a certain direction and may be fabricated from a polymer film mainly consisting of a polyvinyl alcohol based resin. Specifically, each of the first polarizer and the second polarizer may be fabricated by dyeing the polymer film with iodine or dichroic dyes, followed by stretching the dyed film in a machine direction (MD) thereof. Specifically, the first and second polarizers may be fabricated through swelling, dyeing, stretching, and crosslinking.

Each of the first polarizer 110 and the second polarizer 120 may have a total light transmittance of about 41% or more, for example, about 41% to 45%, and a degree of polarization of about 99% or more, for example, about 99% to 100%. Within this range, the first polarizer 110 and the second polarizer 120 can improve screen quality.

Each of the first polarizer 110 and the second polarizer 120 may have a thickness of about 30 μm or less, specifically greater than about 0 μm to about 30 μm, more specifically about 2 μm to about 20 μm, specifically about 4 μm to about 10 μm. Within this range, each of the first polarizer 110 and the second polarizer 120 can be used in the polarizing plate.

Each of the first polarizer 110 and the second polarizer 120 has a light absorption axis corresponding to the machine direction (MD) and a light transmission axis corresponding to the transverse direction (TD). In an optical display device, the light absorption axis of the first polarizer is substantially orthogonal to the light absorption axis of the second polarizer.

First Polarizer Protective Layer

The first polarizer protective layer 310 may be disposed on a light exit surface of the first polarizer 110 to protect the first polarizer 110 or to further improve image quality by affecting light emitted from the first polarizer 110.

The first polarizer protective layer 310 may include a protective film or a protective coating layer.

The protective film is an optically transparent film and may be a film formed of at least one selected from among, for example, cellulose based resins including triacetylcellulose (TAC) and the like, polyester based resins including polyethylene terephthalate (PET), polybutylene terephthalate, polyethylene naphthalate (PEN), polybutylene naphthalate, and the like, cyclic polyolefin based resins, polycarbonate based resins, polyether sulfone based resins, polysulfone based resins, polyamide based resins, polyimide based resins, polyolefin based resins, polyarylate based resins, polyvinyl alcohol based resins, polyvinyl chloride based resins, and polyvinylidene chloride based resins. Specifically, the protective film may be a TAC film or a PET film. The protective coating layer may be formed of at least one selected from among a heat-curable composition and a photocurable composition.

In one embodiment, the first polarizer protective layer may have an in-plane retardation of about 0 nm or more, for example, 0 nm, 500 nm, 1,000 nm, 1500 nm, 2,000 nm, 2500 nm, 3,000 nm, 3500 nm, 4,000 nm, 450 5,000 nm, 6,000 nm, 7,000 nm, 8,000 nm, 9,000 nm, 10,000 nm, 11,000 nm, 12,000 nm, 13,000 nm, 14,000 nm, or 15,000 nm, specifically about 0 nm to about 15000 nm, more specifically about 5,000 nm to about 12,000 nm, at a wavelength of 550 nm. Within this range, the first polarizer protective layer can prevent observation of rainbow mura when formed to have birefringence.

The first polarizer protective layer 310 may have a thickness of about 100 m or less, specifically greater than about 0 µm to 80 µm, more specifically about 5 m to about 80 µm, still more specifically about 15 µm to about 80 µm. Within this range, the first polarizer protective layer can be used in the polarizing plate.

Although not shown in FIG. 1, a functional coating layer is formed on an upper surface of the first polarizer protective layer 310 to provide an additional function to the viewer-side polarizing plate. For example, the functional coating layer may include a hard coating layer, a fingerprint resistant layer, an antireflection layer, an antiglare layer, a low reflectivity layer, and the like. These functional coating layers may be used alone or as a combination thereof.

Second Polarizer Protective Layer and Third Polarizer Protective Layer

The second polarizer protective layer 320 and the third polarizer protective layer 330 may be disposed on a light exit surface of the second polarizer 120 and a light incidence surface of the second polarizer 120, respectively, to protect the second polarizer or to further improve image quality by affecting light emitted from the light source. Alternatively, the second polarizer protective layer 320 may be disposed on the light incidence surface of the second polarizer 120 and the third polarizer protective layer 330 may be disposed on the light exit surface of the second polarizer 120.

Each of the second polarizer protective layer 320 and the third polarizer protective layer 330 may include a protective film or a protective coating layer.

The protective film is an optically transparent film and may be a film formed of at least one selected from among, for example, cellulose based resins including triacetylcellulose (TAC) and the like, polyester based resins including polyethylene terephthalate (PET), polybutylene terephthalate, polyethylene naphthalate (PEN), polybutylene naphthalate, and the like, cyclic polyolefin based resins, polycarbonate based resins, polyether sulfone based resins, polysulfone based resins, polyamide based resins, polyimide based resins, polyolefin based resins, polyarylate based resins, polyvinyl alcohol based resins, polyvinyl chloride based resins, and polyvinylidene chloride based resins. Specifically, the protective film may be a TAC film or a PET film. The protective coating layer may be formed of at least one selected from among a heat-curable composition and a photocurable composition.

In one embodiment, the second polarizer protective layer may have an in-plane retardation of about 0 nm or more, for example, about 0 nm to about 20 nm, at a wavelength of 550 nm. Within this range, the second polarizer protective layer does not affect light emitted from the second polarizer. The third polarizer protective layer may have an in-plane retardation of about 0 nm or more, for example, about 0 nm to about 15,000 nm, or about 5,000 nm to about 12,000 nm, at a wavelength of 550 nm. Within this range, the second polarizer protective layer can prevent observation of rainbow mura when formed to have birefringence.

In another embodiment, the second polarizer protective layer may have an in-plane retardation of about 0 nm or more, for example, about 0 nm to about 15000 nm, specifically about 5,000 nm to about 12,000 nm, at a wavelength of 550 nm. Within this range, the second polarizer protective layer can prevent observation of rainbow mura when formed to have birefringence. The third polarizer protective layer may have an in-plane retardation of about 0 nm or more, for example, about 0 nm to about 20 nm, at a wavelength of 550 nm. Within this range, the second polarizer protective layer does not affect light emitted from the second polarizer.

Each of the second polarizer protective layer 320 and the third polarizer protective layer 330 may have a thickness of about 100 µm or less, specifically greater than about 0 µm to about 80 µm, more specifically about 5 µm to about 80 m, still more specifically about 15 µm to about 80 µm. Within this range, each of the second polarizer protective layer 320 and the third polarizer protective layer can be used in the polarizing plate.

Each of the second polarizer protective layer and the third polarizer protective layer may be bonded to the second polarizer via the bonding layer described above.

Next, an optical display device according to one embodiment of the present invention will be described.

The optical display device includes an optical display module according to one embodiment of the present invention. The optical display device may include a liquid crystal display device, without being limited thereto.

The liquid crystal display device may include an optical display module according to the present invention.

The liquid crystal display device may further include a backlight unit. The backlight unit may be disposed outside the viewer-side polarizing plate or the light source-side polarizing plate. The backlight unit may be manufactured by adopting typical optical elements, such as a light source, a light guide plate, an optical sheet, a reflective plate, a brightness enhancing film, and the like, which are well-known to those skilled in the art.

MODE FOR INVENTION

Next, the present invention will be described in more detail with reference to some examples. However, it should be noted that these examples are provided for illustration only and are not to be construed in any way as limiting the invention.

Example 1

A polarizer having a light transmittance of 43% was prepared by uniaxially stretching a polyvinyl alcohol based film (PS #60, pre-stretching thickness: 60 µm, Kuraray Co., Ltd.) to 6 times an initial length thereof in the MD in an aqueous solution of iodine at 55° C. The prepared polarizers were used as a first polarizer and a second polarizer.

A positive C layer was formed on a lower surface of a triacetylcellulose (TAC) film (KC4CT1W, Re @550 nm: 0 nm to 5 nm, Konica Minolta Co., Ltd.) by coating a positive C layer composition (VM Series, polystyrene based compound contained, Eastman Co., Ltd.) to a predetermined thickness on the lower surface of the TAC film, followed by drying the composition to remove a solvent therefrom. A first retardation layer was a laminate of the TAC film and the positive C layer.

A viewer-side polarizing plate was fabricated by bonding a lower surface of a polyethylene terephthalate (PET) film (AGSR12D-PET, with an antiglare layer formed on an upper surface thereof, Re @550 nm: 8,600 nm, Toyobo Co., Ltd.) to an upper surface of the first polarizer, and bonding an upper surface of the TAC film to a lower surface of the first polarizer. The viewer-side polarizing plate includes the positive C layer, the TAC film, the first polarizer, and the PET film sequentially stacked on a light exit surface of a liquid crystal panel described below.

A light source-side polarizing plate was fabricated by bonding a lower surface of a triacetylcellulose (TAC) film (KC4CT1W, Re @550 nm: 0 nm to 5 nm, Konica Minolta Co., Ltd.) to an upper surface of the second polarizer, and bonding an upper surface of a polyethylene terephthalate (PET) film (TA053, glare layer, Re @550 nm: 8,600 nm, Toyobo Co., Ltd.) to a lower surface of the second polarizer. The light source-side polarizing plate includes the TAC film, the second polarizer, and the PET film sequentially stacked on a light incidence surface of the liquid crystal panel described below.

A liquid crystal panel having a second retardation layer (+A retardation layer) having in-plane retardation Re1 as listed in Table 1 at a wavelength of 550 nm and including a liquid crystal layer (including IPS mode liquid crystals) was prepared.

A liquid crystal display module was fabricated by bonding the viewer-side polarizing plate to an upper surface of the liquid crystal panel and bonding the light source-side polarizing plate to a lower surface of the liquid crystal panel such that the light absorption axis of the first polarizer is orthogonal to the light absorption axis of the second polarizer and the first retardation layer is disposed between the liquid crystal panel and the first polarizer.

Examples 2 to 6

Liquid crystal display modules were fabricated in the same manner as in Example 1 except that in-plane retardation Re1 @550 nm of the second retardation layer, out-of-plane retardation Rth2 @550 nm of the first retardation layer, and out-of-plane retardation Rth3 @550 nm of the positive C layer were changed as listed in Table 1.

Example 7

A liquid crystal display module was fabricated in the same manner as in Example 1 except that a positive C layer composition (VM Series, cellulose ester based compound-contained, Eastman Co., Ltd.), in-plane retardation Re1 @550 nm of the second retardation layer, out-of-plane retardation Rth2 @550 nm of the first retardation layer, and out-of-plane retardation Rth3 @550 nm of the positive C layer were changed as listed in Table 1.

Comparative Example 1

A light source-side polarizing plate was fabricated in the same manner as in Example 1.

A first polarizer was fabricated in the same manner as in Example 1. A lower surface of a polyethylene terephthalate (PET) film (AGSR12D-PET, with an antiglare layer formed on an upper surface thereof, Re @550 nm: 8,600 nm, Toyobo Co., Ltd.) was bonded to an upper surface of the first polarizer, and an upper surface of a triacetylcellulose (TAC) film (KC4CT1W, Re @550 nm: 0 nm to 5 nm, Konica Minolta Co., Ltd.) was bonded to a lower surface of the first polarizer. A viewer-side polarizing plate was fabricated by sequentially stacking a positive C layer (Rth @550 nm: −100 nm) and a positive A layer (Re @550 nm: 90 nm) on a lower surface of the triacetylcellulose film. The viewer-side polarizing plate includes the positive A layer, the positive C layer, the TAC film, the first polarizer, and the PET film sequentially stacked on a light exit surface of a liquid crystal panel described below.

A liquid crystal display module was fabricated by attaching the viewer-side polarizing plate and the light source-side polarizing plate to a light exit surface and a light incidence surface of the liquid crystal panel (not having phase retardation, not having positive A retardation layer, IPS liquid crystal layer included), respectively.

Comparative Examples 2 to 6

Liquid crystal display modules were fabricated in the same manner as in Example 1 except that in-plane retardation Re1 @550 nm of the second retardation layer, out-of-plane retardation Rth2 @550 nm of the first retardation layer, and out-of-plane retardation Rth3 @550 nm of the positive C layer were changed as listed in Table 1.

Retardation of each of the second retardation layer, the first retardation layer, and the positive C layer was measured at a wavelength of 550 nm using a retardation tester AxoScan (Axometry Co., Ltd.). All retardation values are represented in nanometers.

Figure 2:
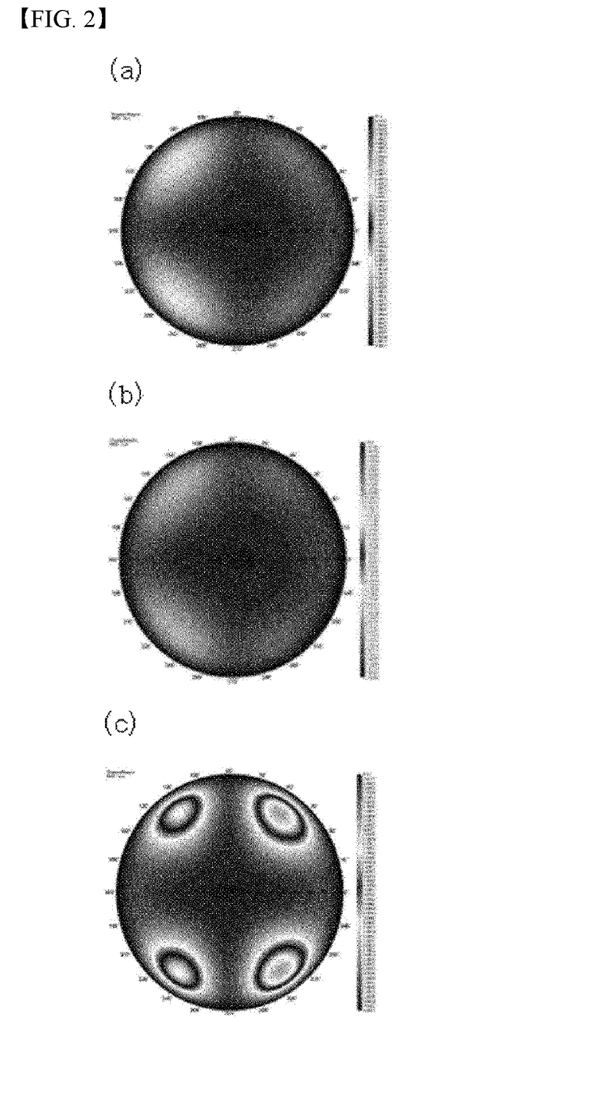

The liquid crystal display modules of Examples and Comparative Examples were measured as to luminance (unit: cd/m2) at (45°, 60°) or (135°, 60°) as ($\varphi$, $\theta$) in a black mode based on TechWiz 1D simulation (Sanayi System). Results are shown in Table 1. In addition, the contrast ratios of the liquid crystal display modules of Example 1, Example 3, and Comparative Example 5 are shown in FIG. 2.

TABLE 1

|  | Re1 | Rth2 | Rth3 | \|Re1 × Rth2\| | Re1/Rth2 | Luminance (@(45°, 60°), black mode) | Luminance (@(135°, 60°), black mode) |
| --- | --- | --- | --- | --- | --- | --- | --- |
| Example 1 | 115 | −80 | −80 | 9200 | −1.4375 | 0.394 | 0.207 |
| Example 2 | 120 | −75 | −75 | 9000 | −1.6 | 0.453 | 0.349 |
| Example 3 | 120 | −90 | −90 | 10800 | −1.333 | 0.280 | 0.298 |
| Example 4 | 120 | −100 | −100 | 12000 | −1.2 | 0.580 | 0.552 |
| Example 5 | 130 | −65 | −65 | 8450 | −2 | 0.485 | 0.436 |
| Example 6 | 145 | −70 | −70 | 10150 | −2.071 | 0.543 | 0.512 |
| Example 7 | 130 | −70 | −70 | 9100 | −1.86 | 0.510 | 0.483 |
| Comparative Example 1 | — | — | — | — | — | 1 | 1 |
| Comparative Example 2 | 115 | −130 | −130 | 14950 | −0.885 | 3.769 | 2.996 |
| Comparative Example 3 | 90 | −100 | −100 | 9000 | −0.9 | 3.575 | 3.124 |
| Comparative Example 4 | 110 | −130 | −130 | 14300 | −0.846 | 2.860 | 2.186 |

TABLE 1-continued

|  | Re1 | Rth2 | Rth3 | \|Re1 × Rth2\| | Re1/Rth2 | Luminance (@(45°, 60°), black mode) | Luminance (@(135°, 60°), black mode) |
|---|---|---|---|---|---|---|---|
| Comparative Example 5 | 130 | −120 | −120 | 15600 | −1.083 | 1.125 | 1.164 |
| Comparative Example 6 | 100 | −65 | −65 | 6500 | −1.538 | 1.235 | 1.243 |

As shown in Table 1 and FIG. 2, the optical display modules according to the present invention had a luminance of less than 0.6 cd/m2 at a lateral side in a black mode, thereby improving the contrast ratio at the lateral side. In addition, the optical display modules according to the present invention suppressed light leakage at the lateral side.

Conversely, as shown in Table 1 and FIG. 2, the optical display modules of Comparative Examples 2 to 6, which failed to satisfy Relations 1 and 2, exhibited much higher luminance at the lateral side in the black mode than the optical display modules of Examples, thereby causing a much lower contrast ratio and significant light leakage at the lateral side. Moreover, the optical display module of Comparative Example 1 including the second retardation layer outside the optical display panel to be disposed between the first retardation layer and the optical display panel exhibited much higher luminance at the lateral side in the black mode.

It should be understood that various modifications, changes, alterations, and equivalent embodiments can be made by those skilled in the art without departing from the spirit and scope of the invention.

The invention claimed is:

1. An optical display module comprising: an optical display panel; and a first polarizing plate disposed on at least one surface of the optical display panel,
wherein the first polarizing plate comprises a first polarizer and a first retardation layer disposed between the first polarizer and the optical display panel, the first retardation layer comprising at least a positive C layer;
the optical display panel comprises a second retardation layer therein; and
the second retardation layer and the first retardation layer satisfy formulas 1 and 2:

$|Re1 \times Rth2| \geq 8450$ [Formula 1]

$-2.10 \leq (Re1)/(Rth2) \leq -1.20$ [Formula 2]

where Re1 is an in-plane retardation (unit: nm) of the second retardation layer at a wavelength of 550 nm, and Rth2 is an out-of-plane retardation (unit: nm) of the first retardation layer at a wavelength of 550 nm.

2. The optical display module according to claim 1, wherein |Re1×Rth2| ranges from 8,450 to 13,000.

3. The optical display module according to claim 1, wherein the second retardation layer realizes a positive A (+A) retardation layer.

4. The optical display module according to claim 1, wherein Re1 ranges from about 10 nm to about 150 nm.

5. The optical display module according to claim 1, wherein Rth2 ranges from about −200 nm to less than about 0 nm.

6. The optical display module according to claim 1, wherein the first polarizing plate is disposed outside the optical display panel.

7. The optical display module according to claim 1, wherein the positive C layer has an out-of-plane retardation of about −200 nm to less than about 0 nm at a wavelength of 550 nm.

8. The optical display module according to claim 1, wherein the positive C layer is formed of a composition containing at least one selected from among a cellulose based compound or a polymer thereof and an aromatic based compound or a polymer thereof.

9. The optical display module according to claim 8, wherein the cellulose based compound comprises a cellulose ester based compound and the aromatic based compound comprises a polystyrene based compound.

10. The optical display module according to claim 1, wherein the first retardation layer is a single layer of the positive C layer.

11. The optical display module according to claim 1, wherein the first retardation layer comprises the positive C layer and a protective layer stacked on at least one surface of the positive C layer.

12. The optical display module according to claim 11, wherein the protective layer is be a negative A, negative B, negative C, or positive B retardation layer, with an uniaxial or biaxial property.

13. The optical display module according to claim 11, wherein the protective layer is free from a positive A layer.

14. The optical display module according to claim 11, wherein the protective layer has an in-plane retardation of about 20 nm or less at a wavelength of 550 nm.

15. The optical display module according to claim 1, wherein the optical display panel further comprises a liquid crystal layer therein.

16. The optical display module according to claim 1, wherein the first polarizing plate comprises the first polarizer, the first retardation layer disposed on one surface of the first polarizer, and a first polarizer protective layer disposed on the other surface of the first polarizer.

17. The optical display module according to claim 1, wherein the optical display module comprises the optical display panel, the first polarizing plate disposed on one surface of the optical display panel, and a second polarizing plate disposed on the other surface of the optical display panel.

18. An optical display device comprising the optical display module according to claim 1.

* * * * *